Sept. 23, 1969    J. R. RUSSELL    3,468,411
LITTER CONTAINER

Filed June 22, 1967    2 Sheets-Sheet 1

JOHN R. RUSSELL

ATTORNEY

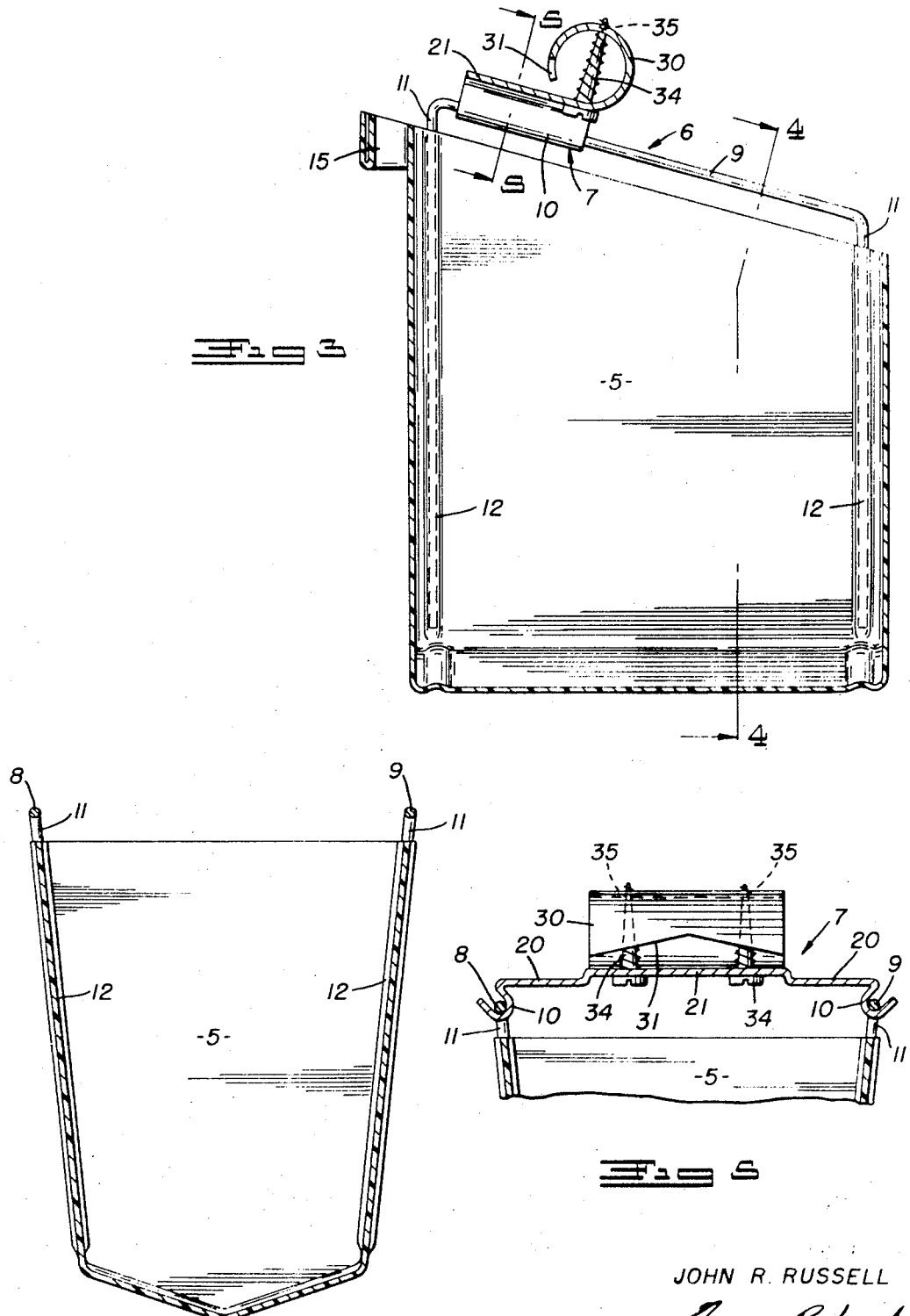

United States Patent Office 3,468,411
Patented Sept. 23, 1969

3,468,411
LITTER CONTAINER
John R. Russell, Cuyahoga Falls, Ohio, assignor to Steere Enterprises Inc., Tallmadge, Ohio, a corporation of Ohio
Filed June 22, 1967, Ser. No. 647,973
Int. Cl. B60n 3/08, 3/12
U.S. Cl. 206—19.5     3 Claims

ABSTRACT OF THE DISCLOSURE

A litter container for an automobile is hung from parallel rods which are slidably supported in grooves in a bracket fastened to the dashboard. The rods slope down under the dashboard. Their ends are turned abruptly down into the four corners of the receptacle portion of the container assembly. This receptacle portion is preferably formed of plastic which is adhered to or attached to the turned-down portions of the rods. The receptacle can be slid out from under the dashboard on the sloping portions of the rods, for use, and after use it can be slid back under the dashboard where it is held by gravity.

---

This invention relates to a litter container and its use on the dashboard of an automobile.

The receptacle portion of the container is preferably composed of a somewhat resilient plastic, although it may be made of cloth or film, etc. It is supported by a frame, and the frame is slidably mounted on a bracket equipped with means for attachment to the underside of the dashboard of an automobile, so that the receptacle can easily be moved out from under the dashboard where it is exposed for use, and returned under the dashboard where its contents are wholly or partially shielded from view. The frame preferably slants down under the dashboard, and this is desirable because it facilitates sliding the litter container under the dashboard when not in use, and it is held there by gravity.

The invention is further described in connection with the accompanying drawings, in which:

FIGURE 3 is a section through the litter container and bracket on the line 3—3 of FIGURE 2;

FIGURE 4 is a section on the line 4—4 of FIGURE 3; and

FIGURE 5 is a front view of the bracket, the upper portion of the rods, and the receptacle.

Figure 1:
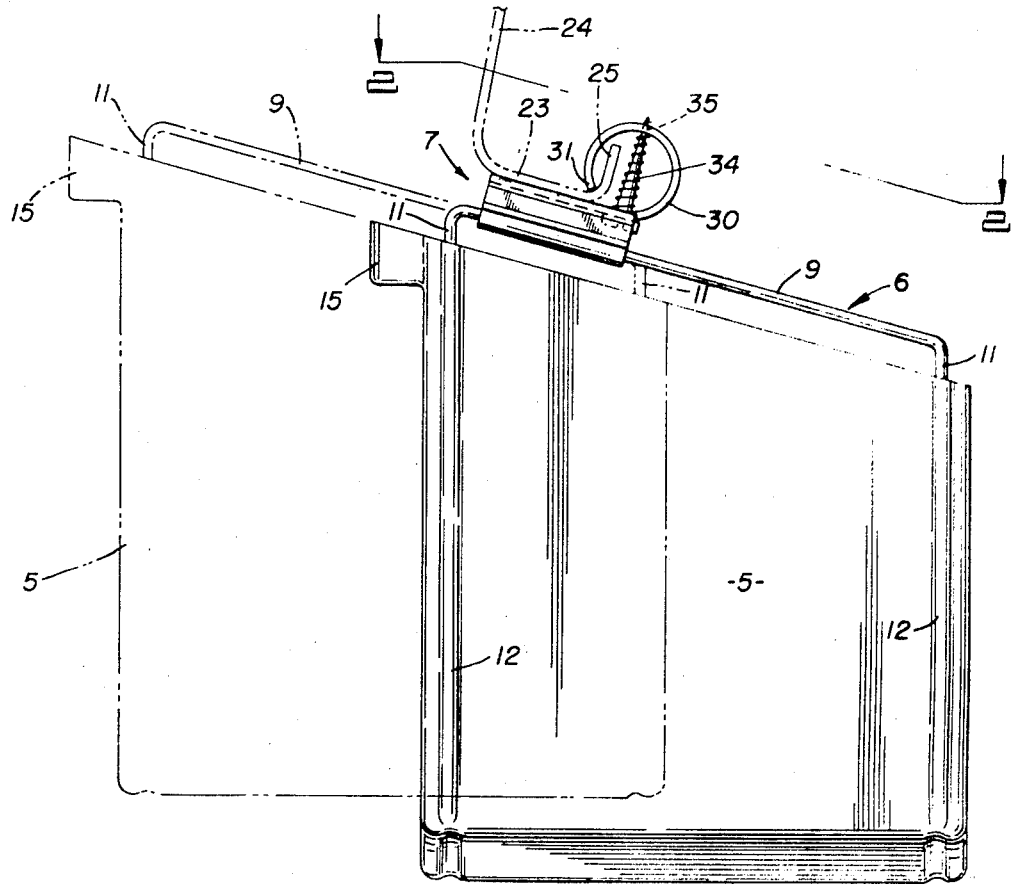
FIGURE 1 is an elevation of the litter container under the dashboard of an automobile (indicated in dot-dash lines), and the position of the litter container in the exposed position is also shown in dot-dash lines.
Figure 2:
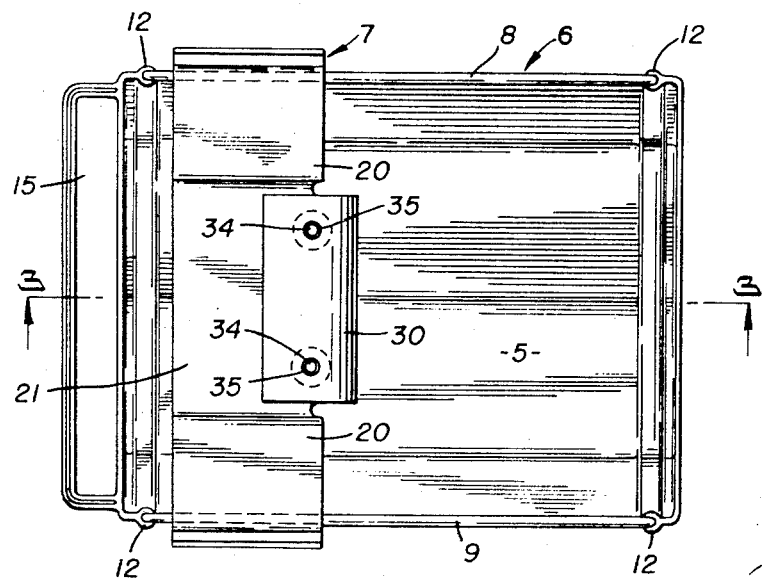
FIGURE 2 is a plan view of the litter container on the line 2—2 of FIGURE 1, the portion of the dashboard shown in dot-dash lines being omitted.

The shape of the receptacle 5 can be varied. It is supported by frame 6 mounted on bracket 7. The parallel rods 8 and 9 at the top of the frame are slidably supported in the grooves 10 in bracket 7.

In the preferred design which is shown in the drawings, the ends of the rods 8 and 9 are bent down to form portions 11 at the four corners of the receptacle. They are located in corner channels 12 which extend almost to the bottom of the receptacle. The receptacle is preferably formed by dipping a form with the rods attached, into a bath of plastic and the plastic is deposited on the form and over the ends of the rods, and at the same time the handle 15 is deposited on a U-shaped extension on the form. The plastic adheres to the rods. Thus the container is formed in a single dipping operation. In the preferred design as shown in FIGURE 4, the sides of the receptacle taper somewhat toward its middle, and the bottom of the receptacle dips in the middle to facilitate removal of the receptacle from the form on which it is dipped.

The bracket 7 is composed of a relatively flat, horizontal base portion 20, although the central portion of this base is preferably elevated at 21 as best shown in FIGURE 5. Such elevation is not essential. It provides a relatively narrow surface to be drawn flush with the undersurface of the turned-back portion 23 of the dashboard. This turned-back portion of the dashboard is indicated in dot-dash lines in FIGURE 1. The vertical portion of the dash is indicated at 24 and the turned-up edge at 25. The rear of the bracket is curled up at 30 and can readily be slipped over the turned-up edge 25 of the dashboard. It will be noted that in the preferred form of the invention the edge 31 of the curl closely approaches the dashboard. After the bracket has been put in place the screws 34 are tightened in threaded openings at 35 in the curled portion of the bracket to reduce the diameter of the curled portion and hold the litter container firmly on the dashboard.

The two edges of the base portion 20 of the bracket are bent down and in and out again to form the upwardly and outwardly facing grooves 10 in which the rods 8 and 9 rest. The rods are slidable in these grooves but cannot be removed vertically from the grooves as when the automobile goes over a bump because the horizontal portions of the bracket extend a sufficient distance outwardly over the grooves to partially cover them.

When the bracket has been fastened in place on the dashboard, the two parallel portions of the rods 8 and 9, which form the upper part of the frame of the litter container are spread sufficiently to be engaged in the grooves 10. The receptacle 5 is preferably formed of a somewhat resilient plastic which has to be stretched slightly in putting the rods in the grooves 10. After the rods are in place the receptacle returns immediately to its original size and holds the rods in the grooves. If the receptacle is of fabric or film that cannot be stretched, it will be made a little wider than the distance between the outer lips of the grooves so that it can be mounted in the grooves, and removed for emptying.

With the receptacle supported by the rods in the grooves 10 of the bracket, the litter container can readily be slid out from under the dashboard for use, and be readily returned to shield its contents from view. Furthermore, the litter container can easily be disengaged from the bracket for emptying, and can then readily be replaced.

The invention is covered in the claims which follow.

I claim:
1. A litter container assembly which comprises a receptacle, a supporting frame which comprises two parallel rods from which the receptacle depends and a bracket with which the rods are slidably engaged; the receptacle being laterally expandable by force applied to the rods, the bracket being provided adjacent its ends with two parallel, upwardly-and-outwardly facing grooves in which the rods are slidably engaged, with the bracket extending a sufficient distance outwardly over the grooves to partially cover the grooves and prevent removal of the rods by vertical movement.

2. A litter container assembly which comprises
 (a) a receptacle of resilient plastic with a rectilinear top opening and four small columnar openings adjacent the corners thereof,
 (b) a frame composed of two rods both ends of each of which are bent down from a straight central portion into the openings in the receptacle with the plastic which forms the openings being fastened thereto, and (c) a generally horizontal bracket with parallel, upwardly-and-outwardly facing grooves adjacent the ends thereof in which said central portions of the rods are slidably engaged, one edge of the bracket being curled back to a position spaced but a short distance from the top of the bracket, and screws extending upwardly through the bracket near the base of the curled portion with their tips threadedly engaged in the top of the curled portion of the bracket so that the diameter of the curled portion of the bracket can be changed by turning the screws.

3. An automobile having a dashboard and a litter container under the dashboard which is slidably attached to the dashboard so as to be movable perpendicularly to the dashboard between (1) a higher position in front of the dashboard in which the contents of the container are exposed and (2) a lower position under the dashboard in which the contents of the container are at least partially shielded from view by the dashboard.

References Cited
UNITED STATES PATENTS

| | | | |
|---|---|---|---|
| Re. 21,080 | 5/1939 | De Boer | 312—246 |
| 2,089,359 | 8/1937 | Goulooze | 312—246 |
| 2,443,381 | 6/1948 | Farrar | 312—246 |
| 2,797,136 | 6/1957 | Nelson | 312—246 |

WILLIAM T. DIXON, Primary Examiner

U.S. Cl. X.R.

312—246; 224—42, 46